J. W. Goodell.
Steam Plow.
Nº 23,767. Patented Apr. 26, 1859.

Witnesses,
Abner Goodell
Geo. J. Howard

Inventor,
J. W. Goodell

UNITED STATES PATENT OFFICE.

J. W. GOODELL, OF EAST WALLINGFORD, VERMONT.

IMPROVEMENT IN STEAM SPADING-MACHINES.

Specification forming part of Letters Patent No. 23,767, dated April 26, 1859.

*To all whom it may concern:*

Be it known that I, J. W. GOODELL, of East Wallingford, in the county of Rutland and State of Vermont, have invented a new and Improved Spading-Machine; and I do hereby declare that the following is a full, clear, and exact description of the same, reference being had to the annexed drawings, making a part of this specification, in which—

Figure 1:
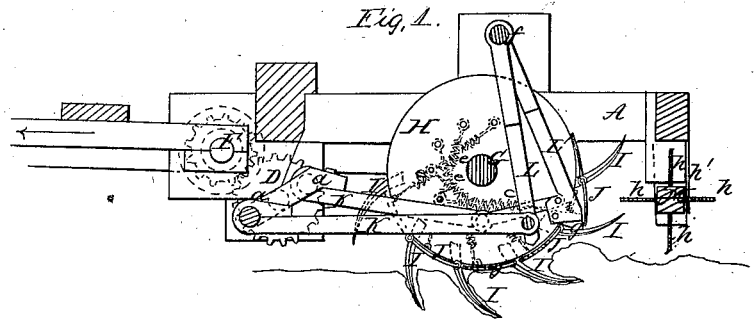
Figure 2:
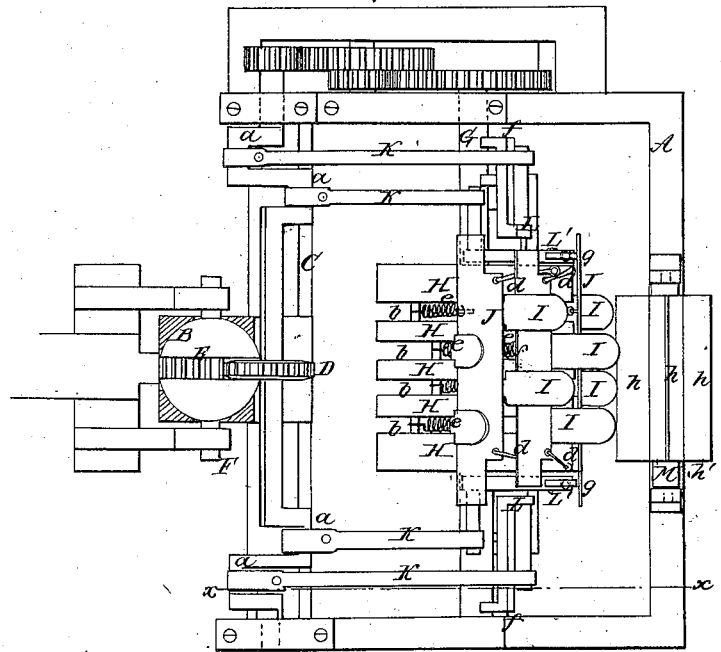

Figure 1 is a longitudinal vertical section of my invention, taken in the line $xx$, Fig. 2; Fig. 2, an inverted plan of the same.

Similar letters of reference indicate corresponding parts in the two figures.

The object of this invention is to obtain a machine by which the soil may be turned and worked in a more perfect manner for cultivation than by the usual plow.

The invention is more especially designed for operation on a large scale, and to supersede the steam-plows that have lately been introduced.

The desired object is attained by the employment or use of a series of wheels attached to a common shaft or axis, the wheels being provided with spades and cleavers, and in certain cases used in connection with revolving wings or blades, substantially as hereinafter described.

To enable those skilled in the art to fully understand and construct my invention, I will proceed to describe it.

A represents a rectangular frame, which is attached by a ball-and-socket or universal joint, B, of any proper construction, to the rear of a traction engine, which may also be constructed and arranged in any proper way to answer the desired purpose. Within the frame A a shaft, C, is placed; said shaft having double cranks $a\ a$ at each end, and a toothed wheel, D, on it at its center. The wheel D gears into a pinion, E, which is attached to a shaft, F, of the connecting-joint B. The shaft F is driven by the engine, and motion communicated therefrom to the shaft C by the gearing D E.

Within the frame A, at about its center, a shaft, G, is placed. This shaft has a series of wheels, H, placed on and secured permanently to it, a space, $b$, being allowed between the wheels. To the peripheries of the wheels H a series of spades, I, are attached. These spades are of curved form, slightly tapered, and have rounded ends, as shown clearly in Fig. 2. These spades are attached to the wheels H circumferentially in rows, the spades of each row being in line with the centers of the spaces between its adjoining rows, as shown clearly in Fig. 2, and the spades are placed in line with the spaces $b$ between the wheels H.

To the peripheries of the wheels H a series of plates, J, are attached by links $d$. These plates are fitted between the spades I and parallel with the shaft G of the wheels H. The links $d$ are attached to one edge of the plates, and to the opposite edges springs $e$ are connected, said springs being secured to the sides of wheels H, and having a tendency to keep the plates J close to the peripheries of the wheels H, the plates filling the spaces between the spades longitudinally with the shaft G.

To each crank $a$ on the shaft G a pitman, K, is attached. These pitmen are connected to arms L L' in the frame A, said arms being fitted loosely on pins or rods $f$ in the frame A. Every alternate plate J has its ends project outward from the end wheels, H, farther than the intermediate plates, and the lower ends of the arms L act against the ends of the longer plates, while the arms L' act against the shorter plates, the lower ends of the arms L' being provided with elastic shoes $g$, which allow said arms to pass over the ends of the larger plates during their return movement.

The shaft G is rotated from shaft C by gearing $a^x$, as shown in Fig. 2, and the shaft F is rotated direct from the engine.

Directly back of the wheels H a shaft, M, is suspended. This shaft is provided with radial plates $h$, that are sufficiently wide to project within the plane of rotation of the spades I. The shaft M is of rectangular form at its ends, and a spring, $h'$, bears against one end of it.

The operation of the machine is as follows: The wheels H are rotated with the same speed as the driving-wheels of the engine, and consequently are in themselves driving-wheels, and do not permit the machine to be drawn along by the engine, as power is applied directly from the engine to the machine through the medium of the wheels H, which consequently perform two functions—to wit, that of drivers and as stocks for the spades I—the frame A being allowed to conform to the inequalities of the ground in consequence of the universal-joint connection B. The spades I enter the earth, as shown clearly in Fig. 1, and raise it in clods similar to a hand-spade, and the plates J are at the proper time thrown outward by the arms L L', and serve as clearers to throw off the contents of the spades, the arms L L' acting alternately against the plates J, and the elastic shoes $g$, as before stated, permitting the arms L' to pass over the ends of the larger plates J, the plates or clearers being brought back to their original position by the springs $e$. The radial plates $h$ receive the contents of the spades I and invert or turn them. These plates $h$ are rotated by the action of the spades themselves, the spring $h'$ serving as a stop; and they are necessary in spading sod-ground, as the sods should be inverted; but in spading stock-ground they may be dispensed with.

This machine may be constructed at a moderate cost, and will perform the work of turning the soil in a far superior manner to plowshares.

I am aware that spades have been attached to rotating wheels or cylinders for the purpose of spading or turning the earth, and I do not claim separately such device; but I do claim as new and desire to secure by Letters Patent—

1. The wheels H, provided with spades I, in connection with the clearers J and the rotating plates $h$, arranged for joint operation, substantially as and for the purpose set forth.

2. The attaching of the frame A, which contains the wheels H, to a traction-engine by means of a universal joint, B, in connection with the gearing E D and shaft C, substantially as shown, whereby the frame and the wheels H are allowed to conform to the inequalities of the ground, and the working parts driven direct from the engine.

J. W. GOODELL.

Witnesses:
 ABNER GOODELL,
 GEO. I. HOWARD.